No. 717,144. Patented Dec. 30, 1902.
R. W. UHLIG.
TYPE WRITING MACHINE.
(Application filed May 12, 1902.)
(No Model.) 5 Sheets—Sheet 2.
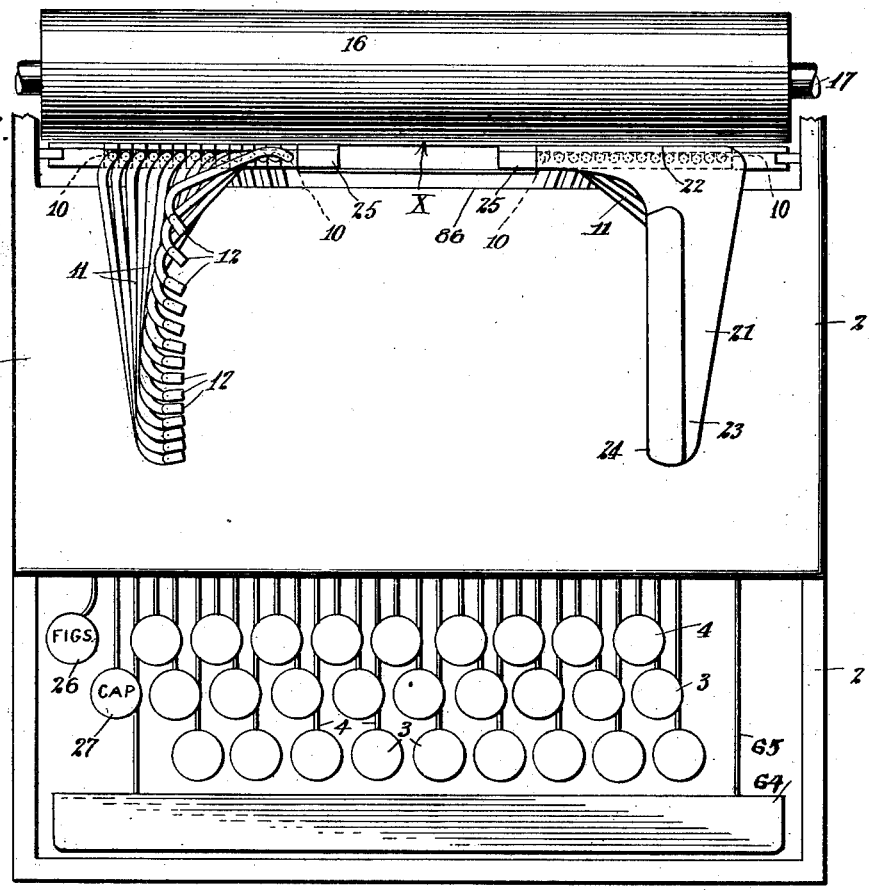
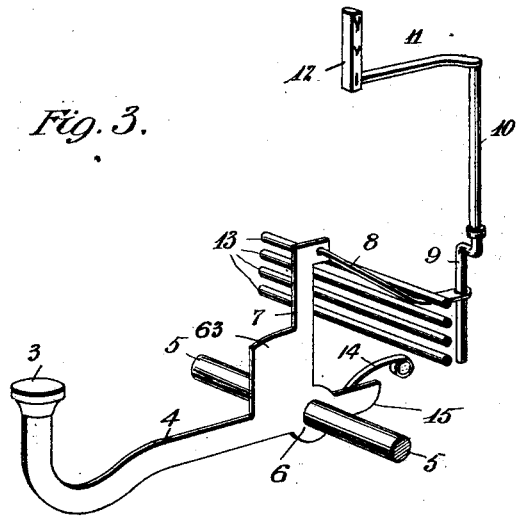

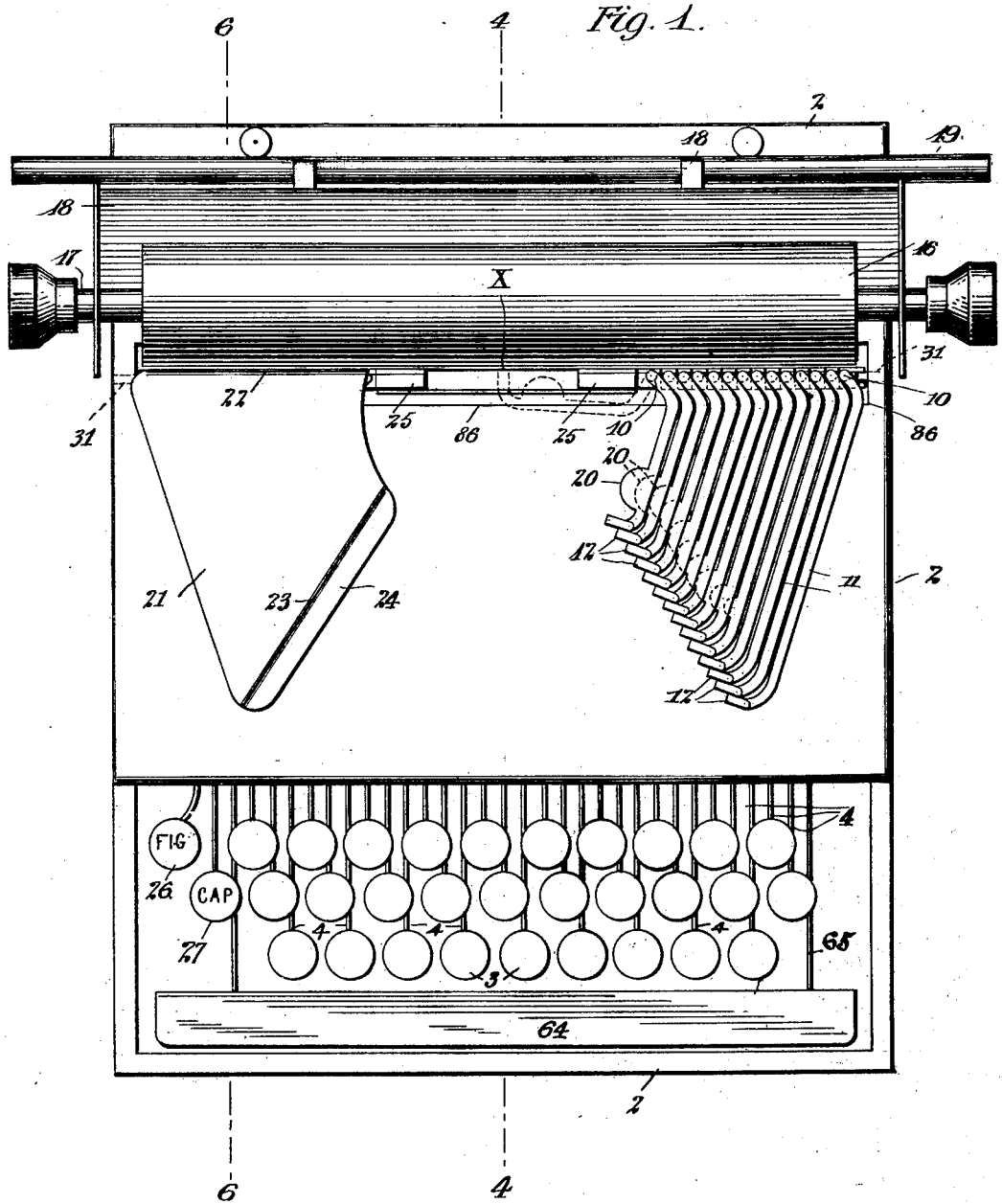

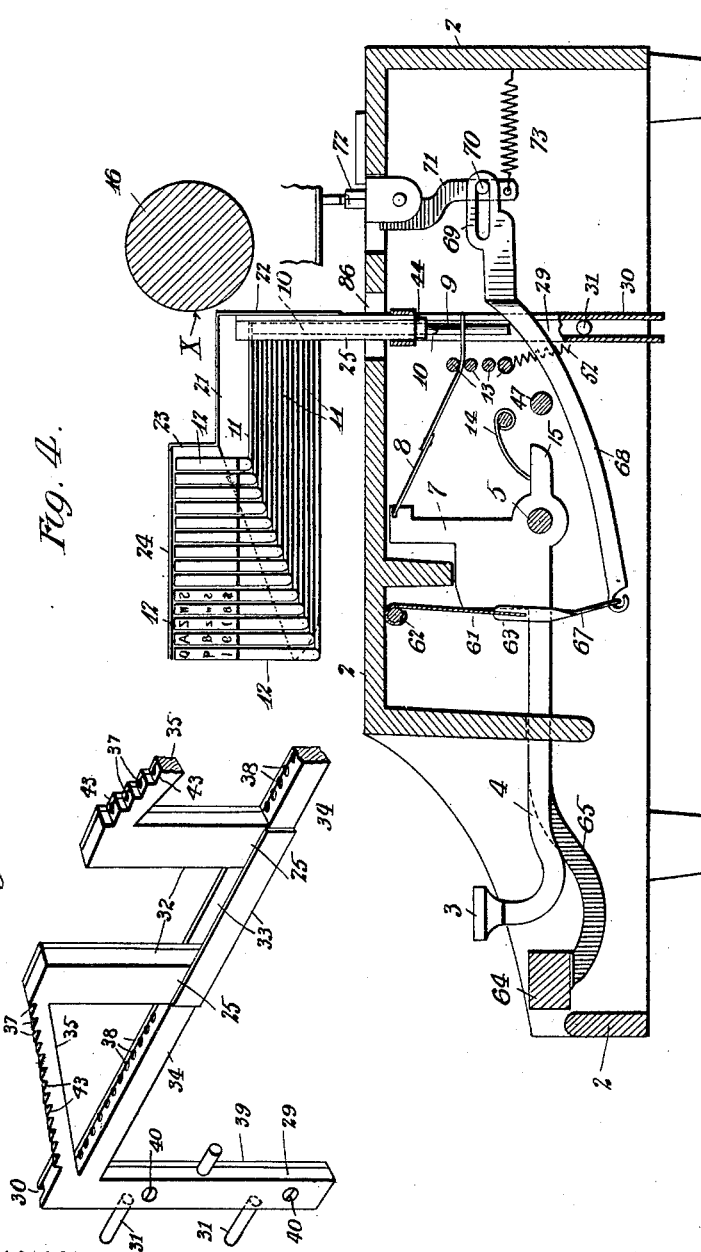

No. 717,144. Patented Dec. 30, 1902.
R. W. UHLIG.
TYPE WRITING MACHINE.
(Application filed May 12, 1902.)
(No Model.) 5 Sheets—Sheet 4.
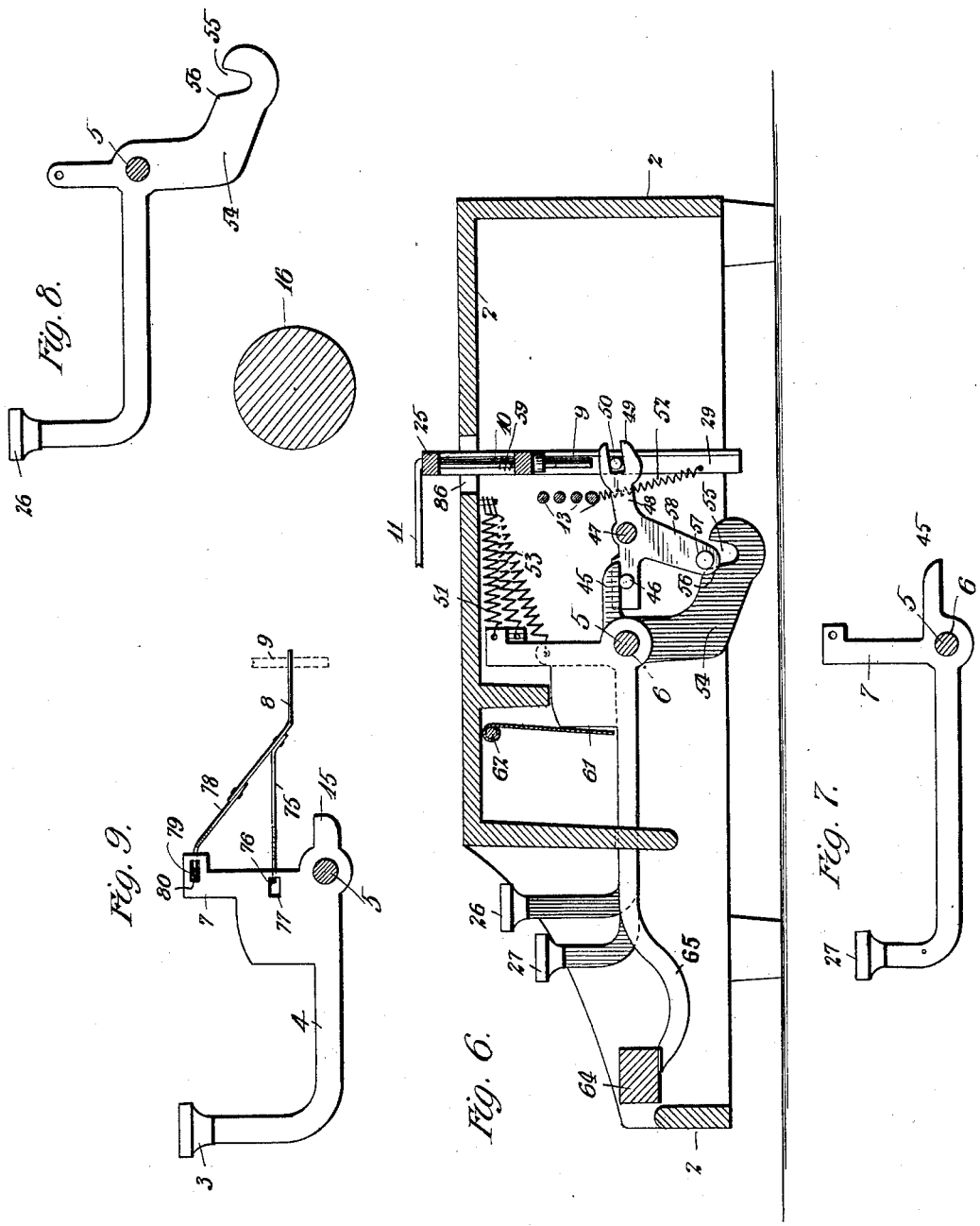
Witnesses
Inventor:
Richard W. Uhlig.
By his Attorney
Willis Fowler No. 717,144. Patented Dec. 30, 1902.
R. W. UHLIG.
TYPE WRITING MACHINE.
(Application filed May 12, 1902.)
(No Model.) 5 Sheets—Sheet 5.
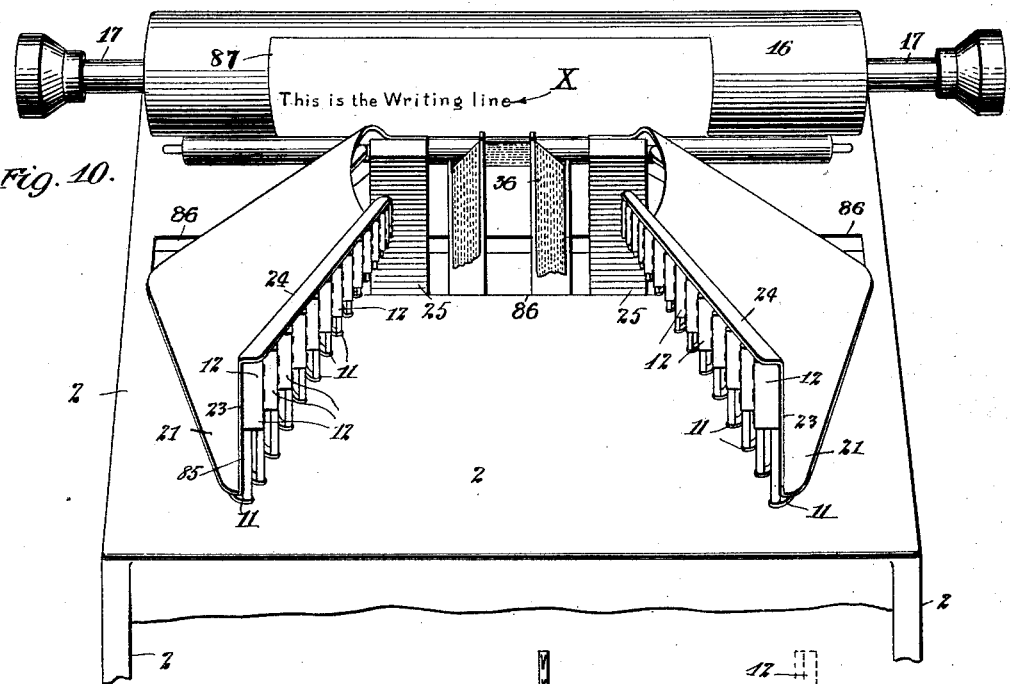
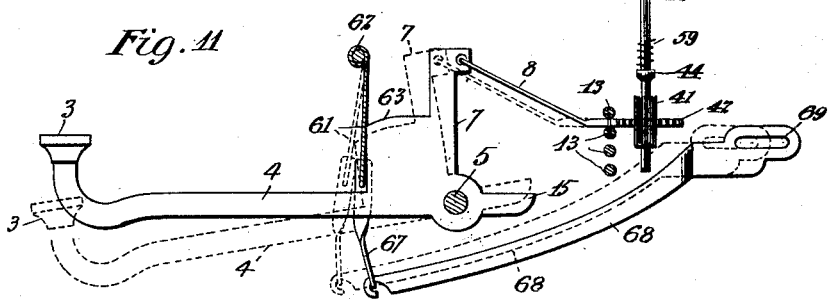
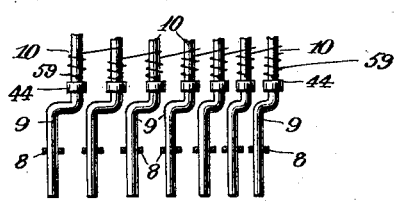
Witnesses
Inventor
Richard W. Uhlig
By his Attorney
Willis Fowler

UNITED STATES PATENT OFFICE.

RICHARD W. UHLIG, OF RUTHERFORD, NEW JERSEY, ASSIGNOR TO HENRY C. ADAMS, OF HACKENSACK, NEW JERSEY.

TYPE-WRITING MACHINE.

SPECIFICATION forming part of Letters Patent No. 717,144, dated December 30, 1902.

Application filed May 12, 1902. Serial No. 106,985. (No model.)

*To all whom it may concern:*

Be it known that I, RICHARD W. UHLIG, a citizen of the United States, residing in Rutherford, in the county of Bergen and State of New Jersey, have invented certain new and useful Improvements in Type-Writing Machines, of which the following is a full, clear, and exact description as will enable any one skilled in the art to which it appertains to make and use the same, reference being had to the accompanying drawings, forming part of this specification.

My invention relates to improvements in bar type-writing machines, and certain of the improvements are particularly adapted to this class of machines in which the writing is what is known as "visible" and wherein the printing-point is in sight and each printed character comes immediately into view of the operator after the impression thereof.

One of the principal objects of my invention is to make the entire length of the printing-line visible to the operator, as well as all the matter preceding the same, while the various parts of the machine are in their proper relative positions for printing, so that no manipulation of any part of the machine is required in order to expose or make visible the printing-line or the printed matter above it.

Other objects of the invention are to simplify the construction and the operation of the type-bars and also the mechanism for shifting the type-bars to select or to bring into position a certain one of the series of characters on a type-bar for taking an impression from it.

A further object of the invention is to simplify and render positive the action of the universal bar as well as the operating-keys.

Having these and other objects in view, the invention consists in the several novel combinations and arrangements of the different parts of the apparatus, all as hereinafter fully described and then pointed out in the claims.

I have illustrated an embodiment of my invention in the accompanying drawings, wherein—

Figure 1 is a top plan view of my present improvements shown as embodied in a type-writing machine, but with portions of the machine omitted, as the same are not essential to the operation of the improvements in question. In this view the shield or plate which covers one of the groups or nests of type-bars (the group at the right of the machine) is omitted in order to show the nesting of the type-bars and the relative positions of the rocking portions thereof for actuating the same. Fig. 2 is a plan view similar to that shown in Fig. 1 of a modified form of arrangement of the groups of type-bars with the shield for the left-hand group omitted in order to show the type-bars. Fig. 3 is a perspective view of one of the operating-keys, its lever and its type-bar bearing a series of three characters for printing, together with the link connecting the key-lever and the type-bar for actuating the latter. Fig. 4 is a vertical central sectional view of the apparatus shown in Fig. 1, the plane of the section being indicated by line 4 4 in Fig. 1, but with some of the keys, key-levers, and their connecting-links omitted. Fig. 5 is a perspective view of the shifting type-bar holder shown as detached and with one end thereof broken away. Fig. 6 is a vertical sectional view of the apparatus shown in Fig. 1, but with the type-bars omitted, the section being taken on a plane indicated by line 6 6, Fig. 1, to show the mechanism for shifting the type-bar holder up and down to select a particular character on the type-bar for printing. Fig. 7 shows a side view of the shifting-key and its lever for shifting downwardly or depressing the type-bar holder. Fig. 8 is a side view of the shifting-key and its lever for shifting upwardly or elevating the type-bar holder. Fig. 9 is a side view of one of the operating-keys and its lever, together with a forked connecting-link having two points of loose attachment with the key-lever, as hereinafter explained. Fig. 10 is a front perspective view of the upper portion of the machine, including the platen or paper-roller and the two groups of type-bars arranged one at each side of the printing-point and in such manner that the entire printing-line, as well as all the matter preceding it, is clearly visible to the operator of the keyboard. Fig. 11 is a side view of an operating-key, its lever, and the type-bar actuated thereby, together with the part connecting the key-lever and the type-bar for actuating the same, such connection being a modified form in the shape of a rack and pinion. Fig. 12 shows a modified construction of the type-bar cranks.

Referring to the drawings, in which like numbers of reference designate like parts throughout, 2 indicates the framework of the machine, in the front part of which is arranged the operating-keys, comprising the fingerpieces or buttons 3, which bear the characters that are to be printed, and which pieces are mounted upon key-levers 4, which vary in length according to the position of the key in the keyboard. Each lever turns or rocks upon a fixed fulcrum-rod 5, which is set crosswise of the machine-frame, as indicated more particularly in Figs. 4 and 6. These levers are shown as fulcrumed upon rod 5 by means of an eye 6, formed in the lever, the outer and long arm of the lever bearing the key proper, while the inner and short arm 7 thereof is adapted to actuate a type-bar and cause it to print. In the particular construction herewith shown the connection between the keylever and the type-bar is that of a loose link 8, the outer end of which is loosely connected with the short arm 7 of the key-lever, while the other end of the link has a loose and sliding connection with a crank 9, secured to the rock-shaft 10, from which projects a rigid arm 11, carrying at the end thereof a typebar 12, which bears a series of characters for printing, the number here shown being a series of three characters, as shown in Figs. 3 and 4, the characters comprising the alphabet and the numerals and the punctuating and other writing marks usually employed in typewriting machines. Considered in the broad sense of my invention, the type-bar or the part bearing the writing characters includes the parts 9, 10, 11, and 12, which is so mounted in suitable bearings that the main portion 10 thereof acts as a rock-shaft, about the axis of which the type is swung to carry it against the platen and away from the same. The short end 7 of the key-lever and the crank 9 of the type-bar are arranged in such relative positions and the link 8 is bent in such a manner that the full depression of the outer end of the key-lever by means of the key actuates the crank 9 through an arc of sufficient length to throw the type from its normal position against the platen. The operating-keys being arranged in different transverse rows, the outer arm of the key-levers vary in length in accordance with the row in which its key is arranged, and the varying lengths of the outer arms of the key-levers necessitate a variation in the length of the short arms 7 thereof from the fulcrum-point on the rod 5. Again, the type being different distances from the printing-point they have to travel over paths of different lengths in some instances from their normal positions, and this requires that the rigid arms 11 be varied in length in accordance with the normal position of the respective type which they each bear. The links 8, while they are constructed substantially alike, also vary in length, as the cranks 9, to which they are connected, are arranged side by side in the same plane, and which plane is normal to the planes of the key-levers.

The links 8 are preferably made flat and each passes between horizontal guide-bars 13, which are four in number and are arranged in a vertical plane extending transversely of the machine and with sufficient space between them to permit of the links 8 playing freely in their movements when pulling upon their respective cranks 9 by the action of the keylever attached to the link. Each key-lever is provided with a suitable spring 14, which bears upon a fixed piece 15, projecting beyond the fulcrum-point of the lever, as indicated in Figs. 3 and 4, and this spring serves to restore the key-lever to its normal position after it has been depressed to its lowest position and the finger removed therefrom. As the key-lever is restored to its elevated position by its spring the link 8, connected with such lever, is pushed inwardly, so as to turn the crank 9 backwardly, and thereby swing the type controlled thereby away from the platen.

It will be noted that the line containing the series of characters on a type-bar 12 is parallel with the main portion 10, which serves as a rock-shaft, and that this relation is maintained throughout the action of the type. I show the type-bars as preferably arranged in vertical positions, the same positions being assumed by the rock-shafts 10, and in this arrangement the type are swung in arcs in the horizontal plane, so that the actual weight of the type is not such a factor in the movement toward or away from the platen as it would be if the type traveled in a plane other than the horizontal.

The platen 16 is shown in the form of an ordinary cylindrical roller, which is mounted fast upon a rotary shaft 17, mounted in the carriage-frame 18, which moves horizontally upon a guide-bar 19 step by step toward the left-hand side of the machine for letterspacing upon the operation of each operatingkey in a manner well known. I find that the horizontally-swinging type-bars are very efficient in the ease with which they are actuated and controlled and also in regard to the speed with which they may be operated, the arrangement permitting of a very rapid action. Another important advantage in my particular construction and arrangement of the type-bar is that perfect alinement is secured largely on account of the fact that the rock-shafts for actuating the bars are arranged in vertical positions and the play thereof is practically limited to one direction. By virtue of this particular arrangement of the type-bars I am also enabled to give a clear view of the writing-line, as will be understood from Figs. 1, 2, 4, and 10.

The rock-shafts 10 of the type-bars are preferably arranged side by side in the same vertical plane, and they are assembled in two main groups, one at each side of the printing-point, which is indicated at X in Figs. 1, 2, and 10. The plane containing the axis of the rock-shafts 10 is parallel with the printing-line, and these shafts are mounted quite close to the platen, and considering one of these groups each shaft is slightly farther removed from the printing-point X than the other, and this necessitates a variation in the length of the rigid arm 11 for each type-bar, the shaft 10 which is nearest to the printing-point being provided with the shortest arm 11, while the next adjacent shaft 10 is provided with an arm 11 slightly longer than the first-mentioned one, and so on to the end of the group, the shaft that is farthest removed carrying the longest arm, as indicated in the drawings. These type-bearing arms 11 are each of such a length that when swung around toward the platen the type 12, which it carries, is brought into true position at the printing-point X. In the arrangement shown in Fig. 1 the type-bearing arms 11 are so shaped and disposed in such normal relative positions that each one has substantially the same angular movement on its center of motion as the other. Assuming such angular motion to be about a quarter of a circle, it will be noted that each of the type-bearing arms has a quarter-circle of angular movement, so that each of the rock-shafts 10 is rocked through the same angular distance—that is, a quarter of a circle—and accordingly the cranks 9 of the rock-shafts are of the same length or leverage in the construction shown in Fig. 1. In cases where the disposition of the type-bearing arms is such that some of them move through greater angular distances than the other their respective rock-shafts must be moved through corresponding angular distances, and where that is necessary I vary the leverage or length of the cranks 9, as shown in Fig. 12, wherein the rock-shaft 10 that is nearest the printing-point has a crank 9 of shorter leverage than the next succeeding rock-shaft, and so on through the series to the outermost rock-shaft, which has a longer crank than the others.

As the type-bearing arms 11 vary in length, the type are caused to swing through varying distances—that is, the type on a long arm swings through a path of greater length than that on a shorter arm. I make the shorter arms heavier or provide them with weights, as indicated at 20 in Fig. 1, in order that the momentum of the type carried by a shorter arm may be made substantially equal to that of a longer arm to cause each type to strike with about the same force against the platen in printing. This difference in weight may be brought about in any desired well-known way, and it serves also to make uniform the pressure required to depress each one of the operating-keys.

Where it is necessary to apply a somewhat greater force to actuate the type-bars, which are carried by the long arms 11, I employ a particular form of the connecting-link 8, as shown in Fig. 9. In this form of link the outer end thereof is forked, with one branch 75 of the fork having its end formed with a hook 76 and taking into a slot 77, formed in the short arm 7 of the lever 4, while the other part 78 of the fork has its end hooked at 79 and takes into a slot 80, formed in the upper end of the short arm 7 of the key-lever and at a point considerably farther from the fulcrum-rod 5 than the connection-point of the lower part 75 of the fork. When these described parts are in normal positions, as shown in Fig. 9, the hooked end 76 of the lower part 75 of the fork is in engagement with the inner end of the slot 77, while the hooked end 79 of the upper part of the fork lies at a point near the outer end of its slot 80, so as to provide lost motion between the hooked end 79 and the inner end of the slot 80. When the key of the lever 4 is depressed, the lower part 75 of the fork is pulled upon by a comparatively short arm of the lever, thereby increasing the power of the initial movement of the key-lever upon the connecting-link 8 and serving to at once overcome the inertia of the connected parts. After the outer end of the key-lever 4 has been depressed a slight distance the inner end of the slot 80 engages the hooked end 79 of the upper part 78 of the fork of the link and pulls upon it, and this continues throughout the full downward movement of the key-lever. This connection of the upper part 78 of the fork with the head of the short arm of the key-lever serves to impart to the connecting-link the required long stroke, which would not be obtained if the upper part 78 of the connecting-link were dispensed with. By this peculiar construction of the connecting-link 8 having two points of connection with the inner arm of the key-lever, one point of connection being nearer to the fulcrum-point of the lever than the other and the point of connection distant from the fulcrum-point having lost motion in the initial movement of the key-lever, I equalize the tension on the keys, so that the same amount of force is required to actuate each key.

The upper ends of the rock-shafts 10 of the type-bars are arranged in each group on different levels, the shaft nearest the printing-point being higher than the one next adjacent to it, and so on through the series, so that the type-bearing arms 11 are set in planes one beneath the other, reckoning from the shorter arm, and this gives a stepped arrangement of these parts, the steps descending from a point near the printing-point to a point remote therefrom at the side of the platen. This sloping or stepped arrangement gives an unobstructed view of the platen and not only the entire printing-line is visible, but also the portion above as well as below it. This view of the portion of the platen below the printing-line enables the operator to see when the end of the sheet of paper is approaching the printing-line. This downward slope of each group of type-bars toward the side of the machine makes a most compact arrangement, and it affords the operator full access to the platen and paper-carriage and other parts of the machine back of the type.

Each group of type-bars at the respective sides of the printing-point is provided with a shield 21, which is secured by its back edge to a suitable part, and is shaped to conform to the slope of the stepped arrangement of the type-bearing arms 11, and is formed with a vertical part or abutment 23 at its inner edge, along the upper part of which is a horizontal flange 24, projecting inwardly. The inner face of the abutment 23 is covered with a soft material, such as leather or felt 85, and the upright parts of type-bearing arms 11 are nested against this abutment when they are in normal positions. As the upright parts of the type-bars vary in length, they being shorter the nearer they are to the printing-point, because of the stepped arrangement of the swinging arms, the vertical abutment 23 is narrower near the printing-point than it is at the other end, and it is arranged upon a line that diverges from such point toward the side of the machine, though of course this line upon which the type are nested may be varied from the one described and as shown in Fig. 1. For example, the arrangement may be made like that shown in Fig. 2, wherein the abutment 23 is upon a plane that is normal to the platen and which falls about midway between the two extreme rock-shafts of the group. In either construction when the type are lying against the abutment in normal positions they stand under the flange 24, which serves to conceal and house them.

Each of the type-bars are shown as having three separate characters for printing, which characters are arranged in the same vertical line, and the central one of the series is one of the small letters of the alphabet, so that the depression of each letter-bearing key by itself causes the printing of a small letter. The capital letters and the numerals from "2" to "9," as well as the various punctuating and other marks used in this class of machine, are arranged either above or below the central character on the type, and the type are bodily shifted either downwardly to print the uppermost character or upwardly to print the lowermost one of the three characters of the series. In the construction shown the capital letters are arranged above the central character on the type, which is a small letter, and the numerals and punctuating and other marks are located below said central character. A shifting-key 26, bearing the inscription "Fig," is provided for shifting the type bodily in an upward direction to bring into proper printing position the lowermost type characters, and a second shifting-key 27, bearing the inscription "Cap.," is provided for bodily shifting the type in a downward direction to position the same properly to print the uppermost characters thereon. This feature of vertically shifting the type bodily either above or below the normal plane is a novel one, and any suitable well-known means may be provided for carrying or holding all the type to simultaneously shift them through means of the two shifting-keys referred to. In the present construction the shifting mechanism comprises a vertically sliding or shifting holder 25, consisting in an open frame having vertical side pieces 29, each formed upon its outer face with a guide-groove 30, which moves over inwardly-projecting pins 31 31, fixed upon the inner face of the machine-frame 2 and arranged one above the other. Near the center of the holder-frame are two vertical pieces 32, which are spaced a considerable distance from each other and are rigidly secured together near their lower ends by cross-pieces 33. Between each central upright 32 and its side piece 29 are secured a lower horizontally-extending cross-piece 34 and an upper cross-piece 35, which extends in an inclined position downwardly from the center piece 32 to the side piece 29. This holder is made of sufficient width in the plane in which it moves to afford suitable bearings for the swinging type-bars which are mounted therein, and its length is sufficient to accommodate the two groups of the type-bars, one of which groups is mounted in one side of the holder and the other in the other side, a sufficiently large space being left it at the center of the holder between the upright parts 32 to receive the ribbon-carrier, which is indicated at 36, and permit of its vibration toward the platen in a manner well known in the class of ribbon-carriers used in visible-printing type-writing machines.

Each of the groups of type-bars are here shown as fourteen in number, and the rock-shafts 10 thereof are provided with an upper bearing 37 in the inclined part 35 of the holder and a lower bearing 38 in the horizontal part 34, beneath which part the cranks 9 of the shafts are located. The frame of the holder 25 may be made in any suitable manner, though I show it as composed of a main part, in which the bearings 37 and 38 are formed, and a plate-like part 39, which is detachably secured to the main part by means of screws 40 and which also forms a part of the bearings for the rock-shafts where the type-bars are met, so that the crank part 9 and the shaft part 10, and the type-bearing arm 11, as well as the type thereon, are practically of one piece. They are mounted in the holder in their bearings before the plate 39 is applied and secured to the main part of the holder. Of course the holder 25 may be formed with a part at the lower end thereof for providing suitable bearings for the lower ends of each of the rock-shafts; but I find that this is unnecessary and that the shafts and their cranks may be left free below the bearings 38 in the horizontal part 34 of the holder. The bearing 38 and the bearing 37 serve to give each of the rock-shafts a steady and smooth motion.

Each of the rock-shafts 10 is provided with a coil-spring 59, which surrounds it and has one end made fast thereto, with the other end hooked around an adjacent rock-shaft in such a manner that when the shaft to which it is fast is rocked to cause a type to print the spring is made tense and tends to turn the shaft back and swing the type away from the platen. This action of each spring 59 also serves to restore the connected key-lever and its key to normal position after a key has been depressed and then released, and in this respect the springs 59 each act in conjunction with the spring 14 of the connected key-lever. In this way both the type-bar and the key-lever are returned to normal position by the action of these respective springs, one acting upon the key-lever itself and the other upon the type-bar.

In order to permit of the holder 25 being freely shifted up and down, a loose sliding connection is provided between each crank 9 of the rock-shaft and the connecting-links 8, as hereinbefore referred to, such connection being provided by elongating each of the cranks 9, so that in the up and down movements of the holder the cranks may move freely through the eyes in the ends of the links 8, the links being held practically against vertical play by the horizontal bars 13, between which they pass. This construction is a very simple yet efficient form and one that is not likely to get out of order. However, there are many different well-known ways in which this sliding connection between the operating-links 8 and the rock-shafts 10 may be made, one such way being shown in Fig. 11, wherein instead of a crank 9 being used an elongated pinion 41 is employed, the same being fixed to the rock-shaft and gearing with a horizontal rack 42, formed upon the inner end of the link 8, which is connected with the short arm of the key-lever. When a key is depressed, the link 8 is drawn outwardly, and the rack thereon turns the pinion 41, so as to rock the shaft a sufficient distance to throw the connected type against the platen, and the reverse movement of the link returns the pinion and rock-shaft to normal position. With this construction of pinion and rack the type-bars may be shifted vertically up or down, and in such movements the teeth of the elongated pinion 41 will slide between the teeth of the rack in mesh therewith.

The upper side of each of the inclined parts 35 of the holder is formed with a series of steps 43, through the horizontal part of each of which a bearing 37 extends and over which a type-bearing arm 11 swings, and this arrangement may be used to limit the downward play of each arm, the upward play of which is limited by a suitable stop 44, fixed on the rock-shaft below the lower part 34 of the holder-frame. The stops 44 are shown as collars or nuts fixed upon each rock-shaft immediately below the part 34 of the frame against which they each bear.

The shields 21, which cover and protect the type and the type-bearing arms in each group, have their back edges 22 secured in fixed position to the inclined pieces 35 of the holder, and they are so shaped that rising up from the back of the holder a suitable point above the heads of the rock-shafts the shields extend forwardly with just sufficient space beneath them and the heads of the shafts and the backs of the type-bearing arms to clear the same. Thus the shields both move with the holder in which all the type are carried and operated and by means of which they are all bodily shifted.

The shifting-key 27, which is the upper-case or capital key, is fulcrumed on the rod 5, the same as the operating-keys, and its short arm 45, projecting back of the fulcrum-point, lies above a projection 46, carried by an extension from the shifting-shaft 47, which is mounted horizontally across the machine-frame parallel with the fulcrum-rod 5 and in bearings, so that it can be turned on its axis. A fixed arm 48 projects from the shaft 47 and is formed with a slot 49, which loosely engages a pin 50 on the holder 25. (See Fig. 6.) The shifting-key 27 is provided with a suitable spring 51, which normally holds the key up at its outer end and keeps the short arm of this key-lever in contact with the projection 46 on the shifting-shaft 47, and thereby prevents the holder 25, with its set of type-bars, from gravitating or dropping down to its lowest point of movement, and in this way the type-bars are normally in such a position that the centrally-located character of each of the type is in position to print. Upon releasing the holder by means of this upper-case or capital shifting-key 27 the weight of the holder causes it to descend and brings the uppermost characters of the type into printing position. At each side of the holder there is arranged a spring 52, the upper end of which is secured to one of the fixed transverse bars 13, while the lower end is secured to a fixed point on the holder 25. These springs pull upwardly on the holder, but not with sufficient strength to overcome the weight of the holder and its contained type-bars when the shifting-key 27 has been depressed to release the same and cause the downward movement thereof. The purpose of these springs 52 is merely to balance the holder and counteract part of its weight. To balance the working of this shifting-shaft 47 in connection with the holder, I duplicate on said shaft 47 at the opposite side of the machine from where the shifting-key 27 is located the fixed arm 48, having a slot 49 loosely engaging a pin 50, fixed upon the adjacent side of the holder.

The shifting-key 26 for raising the type-holder 25 in order to position the lower line of characters on the type for printing the numerals and punctuating-marks and other marks used in type-writing is fulcrumed on the fulcrum-rod 5 and is acted upon by a spring 53, which normally holds the key up, and the inner arm 54 of this key-lever is formed with a notch 55, having at the inner edge thereof a cam 56, and a pin 57, carried by an arm 58, which is fixed upon the shifting-shaft 47, rides over the cam 56 and into the notch 55 of the inner arm of this key-lever. When the holder and the type are in normal position, the pin 57 on the depending arm 58 lies just off the cam 56 by the notch, so that upon pressing the key 26 the cam is caused to ride against the pin and swing the arm 58 backwardly, thereby rocking the shifting-shaft 47 and swinging upwardly the two fixed arms 48, which serve to elevate the holder in the manner hereinbefore described. During this movement the pin 57 gradually enters the notch 55 in the arm 54, and about the time it reaches the bottom of the notch the holder is shifted into its proper upward position, so that the notch thus limits the movement of the holder in this direction.

The main horizontal part of the machine-frame 2 is provided with a narrow transverse opening 86, which is rectangular in shape and extends across the frame practically the entire width thereof. The holder 25 is mounted in this opening 86 and is reciprocated or shifted vertically through the same.

The universal bar 61, which I have herewith shown, is a depending swinging plate-like member which extends horizontally across the machine parallel with the fulcrum-rod 5 of the key-lever and is pivoted at 62 at its upper ends. The lower and free part of this swinging member is acted upon by suitable projections or cams 63, fixed upon each of the key-levers and which bear upon the back of the swinging member and act to swing it forwardly upon the depression of each of the operating-keys. The spacing-bar 64 has a lever 65 at each side of the machine, which is fulcrumed on the fulcrum-rod 5 and provided with a cam 63 for acting upon the free edge of the swinging universal bar in the same manner as the cams of each of the operating key-levers. This swinging universal bar 61 is provided with two depending arms 67, each of which is connected with the end of a forked frame or yoke 68, which extends rearwardly and is formed at its back end with a slot 69, which receives the pin 70 on the end of a part 71, upon which are mounted feed-dogs 72 for the paper-carriage. A spring 73 is connected to a fixed point on the machine-frame and the yoke 68 and serves to normally draw the yoke backwardly, and thereby keeps a tension on the universal bar 61 and holds the same against the projections or cams 63 on the key-levers.

I wish to be understood as not limiting my invention to the precise forms of construction herein set forth, as various modifications may be made in the different parts thereof without, however, departing from the spirit of my invention.

Having thus described my invention, what I claim, and desire to secure by Letters Patent, is—

1. The combination of a platen against which the type act at a point normally visible to the operator, a set of type-bars each provided with a vertical series of characters and each movable in the horizontal plane and disposed practically below the printing-line, means for relatively shifting vertically the said platen and said type-bars to select a certain one of the characters on a type-bar for printing, and a set of operating-keys for actuating said type-bars, substantially as and for the purpose set forth.

2. The combination of a platen against which the type act, a set of type-bars each provided with a vertical series of characters and each movable in upright position to and from the platen in the horizontal plane and disposed practically below the printing-line, means for vertically shifting said type-bars to select a certain character on a type-bar, and a set of operating-keys for actuating said type-bars, substantially as and for the purpose set forth.

3. The combination of a platen against which the type act, a set of type each movable toward and from said platen in paths of varying lengths, a type which moves through a shorter path than another, being weighted or made heavier than the latter in order that the type may have substantially the same momentum when the platen is reached, substantially as and for the purpose set forth.

4. The combination of a platen against which the type act, a set of type-bars having one or more characters thereon, a rigid arm fixed to each of said type-bars at right angles thereto, a rock-shaft fixed to each of said arms at right angles thereto and provided with suitable bearings and formed with a bend therein to constitute an elongated crank, a set of operating-keys and sliding connections between each one of said keys and one of the cranks on the rock-shafts for rocking the shaft in response to the movement of the particular key connected therewith, substantially as and for the purpose set forth.

5. The combination of a platen against which the type act, a set of type-bars having one or more characters thereon, each type-bar being provided with an arm fixed thereto and a rock-shaft fixed to said arm, each of said rock-shafts being provided with suitable bearings and having a rocking device connected therewith, a set of operating-keys each connected with one of the rock-shafts for actuating the same, such connection including a lever controlled by the key and a link connected with said lever and having a loose and sliding connection with the crank of the rock-shaft, substantially as and for the purpose set forth.

6. The combination of a platen against which the type act, a vertically-shifting holder and means for moving said holder to shift the printing position of the type-bars to select a particular character on a type-bar for printing, a set of type-bars each provided with a series of characters and movable toward and from said platen, a shaft for actuating each of said type-bars and the said shafts being mounted practically in the same vertical plane in said holder, and a set of operating-keys connected with and actuating said rock-shafts, substantially as and for the purpose set forth.

7. The combination of a platen against which the type act, a set of type-bars each provided with a series of characters and movable toward and from said platen, a movable holder in which said type-bars are mounted and actuated, means for moving said type-bar holder to shift the printing position of the type-bars to select a particular character on a type-bar for printing, and a set of operating-keys each having a sliding connection with one of said type-bars for actuating the same and permitting of the shifting of the type-bar holder, substantially as and for the purpose set forth.

8. The combination of a platen against which the type act, a set of type-bars each provided with a series of characters and movable toward and from said platen, each type-bar being provided with a shaft for actuating the type, a movable holder in which said type-bar shafts are mounted and actuated, a set of operating-keys for actuating said type-bar shafts and having a sliding connection therewith, means for shifting such type-bar holder to shift the printing position of the type-bars to select a particular character on a type-bar for printing, substantially as and for the purpose set forth.

9. The combination of a platen against which the type act, a set of type-bars each provided with a series of characters and movable toward and from said platen, each type-bar being provided with a shaft for actuating the type, a movable holder in which said type-bar shafts are mounted in the same plane, a set of operating-keys for actuating said type-bar shafts and having a sliding connection therewith, means for shifting such type-bar holder to shift the printing position of the type-bars to select a particular character on a type-bar for printing, substantially as and for the purpose set forth.

10. The combination of a platen against which the type act, a set of type-bars each provided with a series of characters and movable toward and from said platen, each type-bar being provided with a shaft for actuating the type, a flat movable holder in which said type-bar shafts are mounted practically in the same plane, the said type-bar holder being adapted to be shifted in the plane of the shafts mounted therein and means for shifting it to shift the printing position of the type-bars to select a particular character on a type-bar for printing, a set of operating-keys connected with and actuating said type-bar shafts, substantially as and for the purpose set forth.

11. The combination of a platen against which the type act at a point normally visible to the operator, a set of type-bars each provided with a series of characters and movable toward and from said platen, each type-bar being provided with a vertical shaft for actuating said type-bar, means for vertically shifting the said type-bar shaft to select a particular character upon the type-bar for printing, and a set of operating-keys connected with and actuating said type-bar shafts, substantially as and for the purpose set forth.

12. The combination of a platen against which the type act at a point normally visible to the operator, a set of type-bars each provided with a series of characters and movable toward and from said platen, each type-bar being provided with a shaft for actuating the type-bar, a vertically-shifting holder in which said type-bar shafts are mounted and actuated, and means for shifting said holder to select a particular character on a type-bar for printing, and a set of operating-keys connected with and actuating said type-bar shafts, substantially as and for the purpose set forth.

13. The combination of a platen, a set of horizontal swinging type-bearing arms each provided with type and having means for swinging them toward and away from the platen and disposed practically below the printing-line, each of said arms swinging in a different horizontal plane parallel with each other, the said arms each being formed flat in the plane in which it moves and arranged close to each other in such planes, and a set of operating-keys for actuating the arms, substantially as and for the purpose set forth.

14. The combination of a platen, a set of horizontally-swinging type-bearing arms each provided with type, the said arms being arranged in substantially two groups one at each side of the printing-point, the arms of each of said groups being arranged to swing in different horizontal planes parallel with each other and the arm having its center of motion nearest to the printing-point swinging in a plane above the plane of the arm that has its center of motion next nearest to the printing-point and so on throughout each group of arms, the arrangement being such that practically the entire printing-line is visible, and a set of operating-keys connected with and actuating said type-bearing arms, substantially as and for the purpose set forth.

15. The combination of a platen, a vertically-shiftable type-bar holder mounted in front of and below said platen, a group of type-bars mounted in each side of said holder to one side of the printing-point and each type-bar actuated to swing its type toward and away from the platen, and a set of operating-keys for actuating said type-bars, means for vertically shifting said holder, the said holder at each side thereof being inclined or sloped downwardly from a point near the said printing-point and the said type-bars being mounted in said holder in positions of graduated heights conforming to the downward inclination of said holder and leaving the printing-line unobstructed to the view of the operator, substantially as and for the purpose set forth.

16. The combination of the machine-base having a horizontal housing portion formed with an elongated opening, a platen mounted upon said base to the rear of said opening, a vertically-shiftable type-bar holder operating through said opening in the frame and means for shifting said holder, and a set of operating-keys connected with and actuating said type-bars, substantially as and for the purpose set forth.

17. The combination of a movable type-bar having actuating means comprising a key-lever, two separate connections between said key-lever and type-bar one of which connections is attached to said lever at a greater distance from its fulcrum-point than the other and being actuated by said lever after its initial movement, substantially as and for the purpose set forth.

18. The combination of a movable type-bar having actuating means comprising a key-lever, a connecting-link having one end connected with and controlling the movement of said type-bar and the other end forked, the respective sides of said fork being connected with said key-lever at different distances from its fulcrum-point to vary the leverage, substantially as and for the purpose set forth.

19. The combination of a platen, a set of type-bars each having an elongated rock-shaft for moving the type toward and away from the platen, a vertically-shifting holder in which said rock-shafts are mounted practically in the same plane, a spring applied directly to each rock-shaft and acting to turn it backwardly, a set of operating-keys and links connected with said operating-keys and having a sliding connection with said rock-shafts for actuating the same, substantially as and for the purpose set forth.

20. The combination of a platen, a set of type-bars each having a swinging arm bearing the type, the said arms varying in length and the respective type being moved through paths of different lengths, a set of operating-keys connected with and actuating said arms, the leverage of the connection between a key and its arm varying in accordance with the length of the particular arm, substantially as and for the purpose set forth.

21. The combination of a platen, a shiftable holder, a set of type-bars mounted in said holder, operating-keys connected with and actuating said type-bars, two shifting-keys and a rock-shaft connected therewith and adapted to be shifted in one direction on its axis by one key and in an opposite direction by the other, connections between said rock-shaft and the said holder for moving the latter in response to the rocking movement of the shaft, substantially as and for the purpose set forth.

22. The combination of a platen, a set of type-bars each comprising a character-bearing part 12, an arm 11 at right angles thereto, a main part 10 mounted in suitable bearings and provided with a crank 9, a link 8 connected loosely with said crank 9, and a set of operating-keys connected with said links, substantially as and for the purpose set forth.

23. The combination of a platen, a vertically-shiftable holder 25 provided with means for shifting it, a set of type-bars having a series of printing characters thereon and each comprising a character-bearing part 12, an arm 11 and a main part 10, mounted in said holder and provided with a crank 9, and a set of operating-keys connected with the said crank 9, for actuating the same, substantially as and for the purpose set forth.

24. The combination of a platen, a shiftable holder 25 having the sloping sides 35, 35, and provided with means for shifting it, a set of type-bars having a series of printing characters thereon and each comprising a character-bearing part 12, an arm 11, and a main part 10, mounted in said holder, and a set of operating-keys connected with the said main parts 10, for actuating the same, substantially as and for the purpose set forth.

25. The combination of a platen, a vertically-shiftable spring-mounted type-bar holder, a set of type-bars each provided with a series of characters mounted in the said holder, operating-keys connected with and actuating said type-bars, shifting-keys connected with said type-bar holder one serving to shift the holder upwardly to select a certain one of the characters on a type-bar for printing and the other serving to shift the holder downwardly, substantially as and for the purpose set forth.

26. The combination of a platen against which the type act, a set of type-bars each provided with a vertical series of characters and being maintained in upright positions both normally as well as during their operations and movable toward and away from said platen in a horizontal plane, means for relatively shifting vertically the said platen and said type-bars to select a certain one of the characters on a type-bar for printing, and a set of operating-keys for actuating said type-bars, substantially as and for the purpose set forth.

27. The combination of a platen, a set of type-bars and means for actuating the same to print against the platen, a set of operating-keys having key-levers, a link connected with each key-lever and having the other end thereof in sliding connection with the said type-actuating means, and a series of spaced members or bars between which the said links loosely pass, substantially as and for the purpose set forth.

28. In a type-writing machine, the combination of a horizontal platen, with a series of type-bars mounted to operate in parallel horizontal planes below the horizontal plane of the longitudinal axis of the platen, whereby the entire printing-line will be visible to the operator, substantially as and for the purpose set forth.

29. In a type-writing machine, the combination of a horizontal platen, with a series of type-bars mounted to operate in parallel horizontal planes below the horizontal plane of the longitudinal axis of the platen, and a series of type mounted upon and extending vertically from the free ends of the type-bars, whereby the entire printing-line will be visible to the operator, substantially as and for the purpose set forth.

30. In a type-writing machine, the combination of a horizontal platen, with a vertical series of rock-shafts, a series of forwardly-projecting type-bars mounted upon said rock-shafts and operating in parallel horizontal planes below the horizontal plane of the longitudinal axis of the platen, and a series of type mounted upon and extending vertically from the free ends of the type-bars, whereby the entire printing-line will be visible to the operator, substantially as and for the purpose set forth.

31. The combination of a platen against which the type act, a vertical series of rock-shafts provided with suitable bearings and each formed with a right-angled bend constituting a crank for rocking the shaft, a rigid arm extending at right angles from each of said rock-shafts and provided with an upright type having one or more characters thereon, and an operating-key connected with each of said cranks for actuating the same, substantially as and for the purpose set forth.

32. The combination of a platen against which the type act, a vertically-swinging spring-mounted holder and means for moving said holder to shift the printing position of the type-bars, a rock-shaft for each of said type-bars for actuating it, said rock-shafts being mounted in said holder practically in the same vertical plane, and a set of operating-keys connected with and actuating said rock-shafts, substantially as and for the purpose set forth.

In testimony whereof I have hereunto set my hand in the presence of the two subscribing witnesses.

RICHARD W. UHLIG.

Witnesses:
  WILLIS FOWLER,
  SAMUEL M. CHESNUT.